Figure 3:
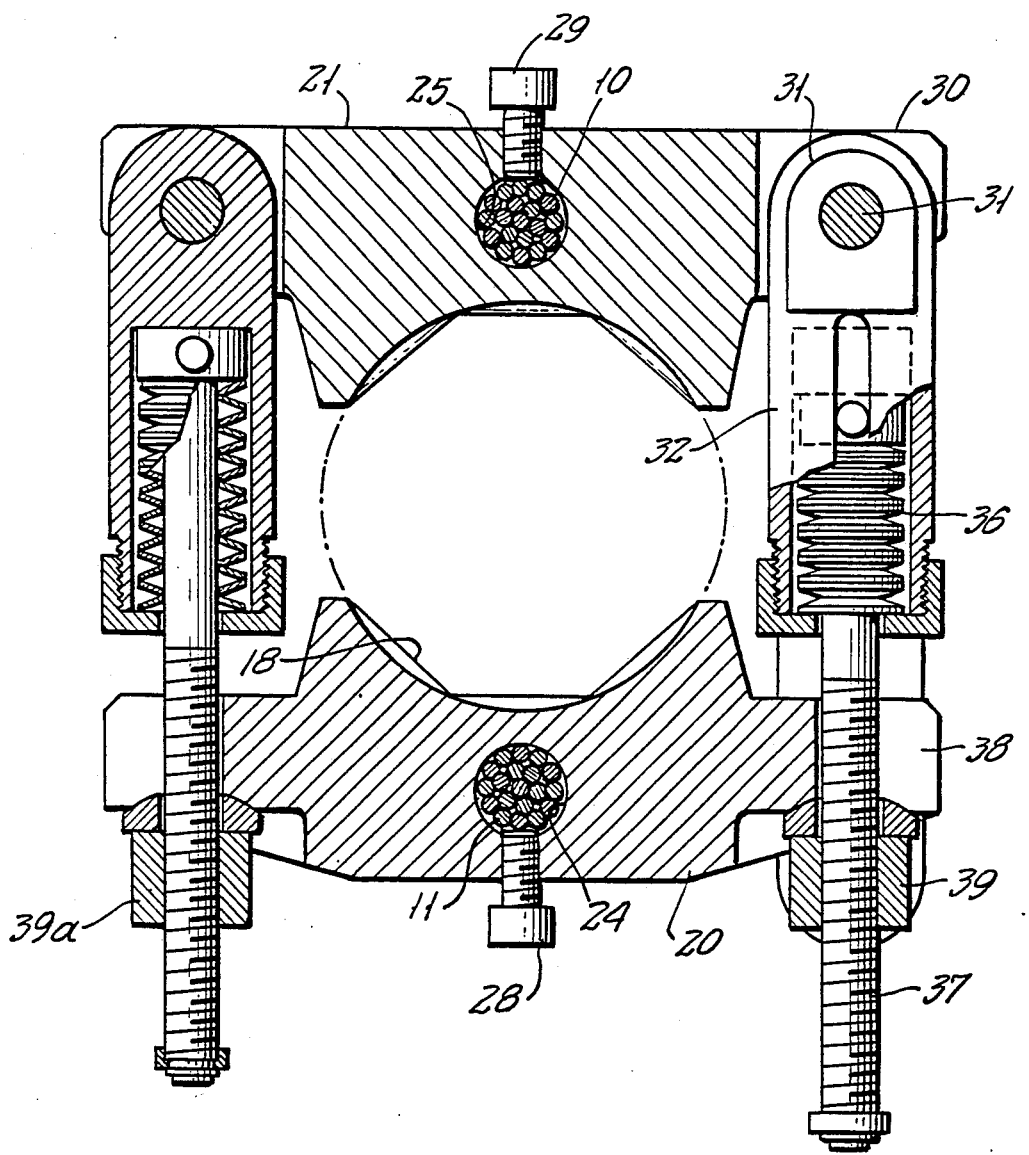

United States Patent [19]
Dotti et al.

[11] Patent Number: 4,676,540
[45] Date of Patent: Jun. 30, 1987

[54] ARTICULATED CABLE CLAMP FOR ELECTRIC CABLE RAISING AND LAYING

[75] Inventors: Enrico Dotti, Milan; Angelo Sala, Merate, both of Italy

[73] Assignee: Societa' Cavi Pirelli S.p.A., Italy

[21] Appl. No.: 809,158

[22] Filed: Dec. 16, 1985

[30] Foreign Application Priority Data

Dec. 21, 1984 [IT] Italy ................ 24221 A/84

[51] Int. Cl.$^4$ ................ B66C 1/42; F16L 1/04
[52] U.S. Cl. ................ 294/86.4; 294/66.1; 405/173
[58] Field of Search ............ 294/86.4, 66.1, 82.11; 405/158, 167, 173, 168, 169; 254/134.3

[56] References Cited

U.S. PATENT DOCUMENTS 3,765,185 10/1973 Peck et al. ................ 294/66.1
3,873,145 3/1975 Adkins et al. ................ 294/66.1
4,332,510 6/1982 Ferrentino ................ 405/173

Primary Examiner—James B. Marbert
Attorney, Agent, or Firm—Brooks Haidt Haffner & Delahunty

[57] ABSTRACT

A clamp for gripping an electrical cable for the purpose of raising the cable from, or for lowering it into, the water. The clamp comprises a plurality of clamping units which are disposed in series in the direction of the length of the cable and which are held together by a pair of flexible wire ropes in a manner which permits them to articulate with respect to each other. Each unit comprises a pair of jaws for receiving the cable therebetween, and the jaws are urged against the cable by adjustable screws acting through springs to press the jaws toward each other.

2 Claims, 3 Drawing Figures

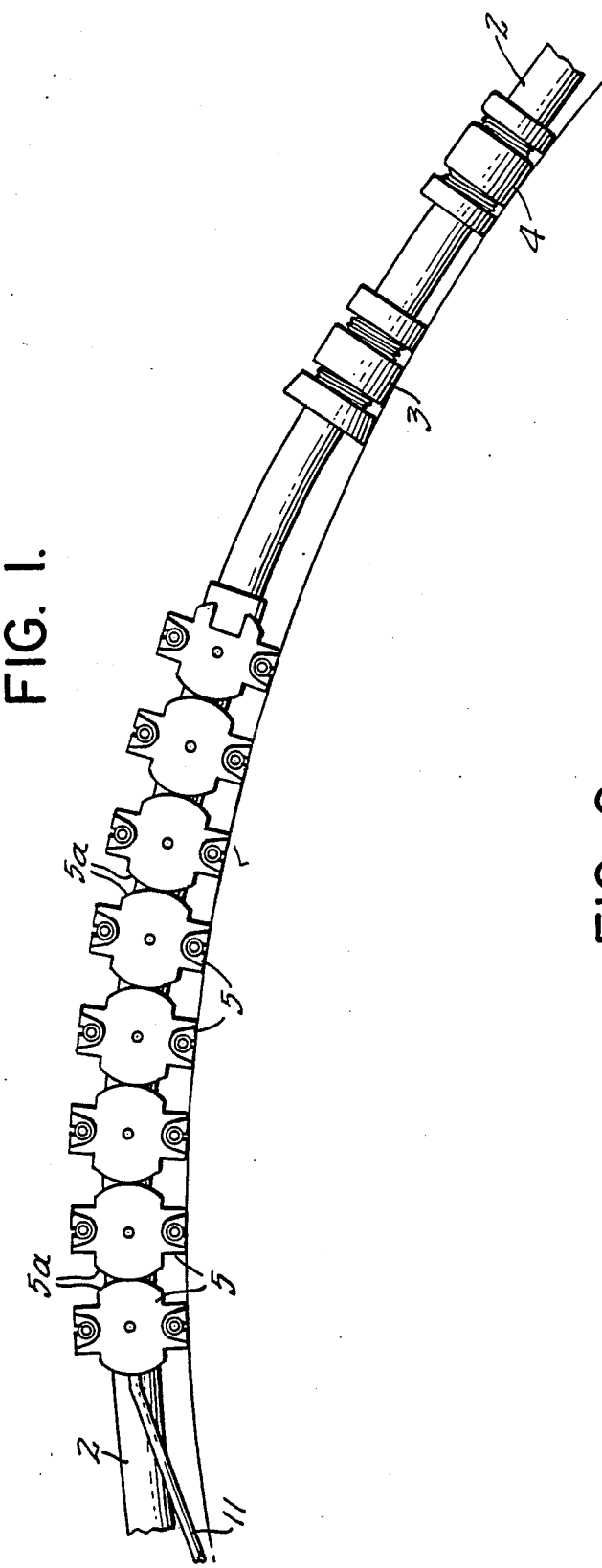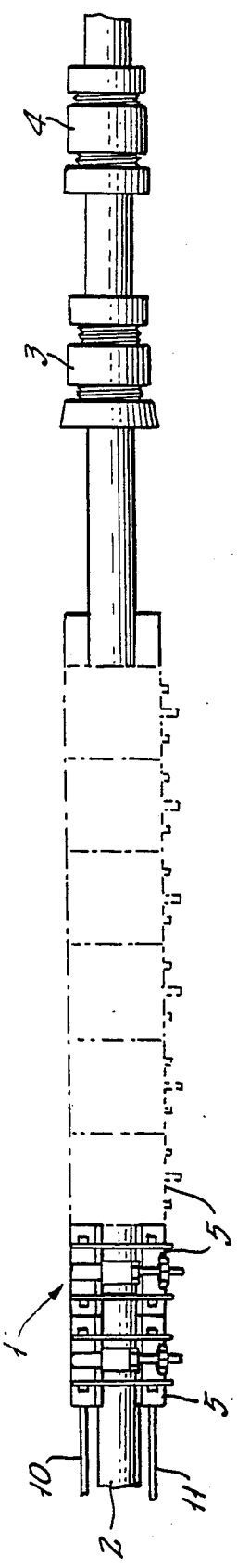

ARTICULATED CABLE CLAMP FOR ELECTRIC CABLE RAISING AND LAYING

The present invention relates to a device for raising a submerged electrical cable and for lowering it back into the water after repairs have been effectuated. Such devices are transported by the ship which has means for repairing the submerged cable, and they constitute that part of the raising apparatus which contacts the cable itself.

Devices of the known type, for raising or laying a submerged electrical cable after repairs, are constituted by a pair of jaws which become locked around the cable and which are connected to a rope which is wound or unwound from a drum operated by a suitable machinery. Such devices have the drawback that, during the movement in the vertical direction, the conductor (or conductors) within the cable are not sufficiently gripped with respect to the outer armoring on which the device is applied. The result is that the conductor can move longitudinally inside the cable, especially when the latter is far from the bottom, and the cable assumes a very inclined position.

During vertical movements, for raising the cable end, or for re-laying it after repairs, the grip between the internal conductor and the surrounding structure of the cable depends substantially upon the value of the friction coefficient between the conductor itself and the surrounding structure of the cable. In fact, due to the effect of its own weight, the internal conductor (or internal conductors) tend to slide with respect to the surrounding structure which is fixed to the raising device. Therefore, the force which holds the cable is proportional to the product of the above-indicated friction coefficient multiplied by the pressure applied to the conductor through the armoring, the sheath, etc. The friction coefficient cannot be modified, and hence, the only force which one can alter is the force of compression applied to the cable, and of course, this may not exceed predetermined limits in order to avoid damaging the cable.

When the laying depth is considerable and/or the average weight of the cable is considerable, the weight of the suspended conductor can overcome the value of the gripping force transmitted to the conductor by the raising device and in this case, the conductor slides inside the cable.

Moreover, the known type of raising device does not guarantee a reliable grip, since, after the locking, the gripped cable yields so much so that, with the passing of time, the grip between the cable and the device tends to become loose.

One object of the present invention is, therefore, to provide a device, of an improved type, which allows for the gripping of a greater portion of the cable in a non-rigid manner in such a way as to uniformly distribute the load and to prevent the conductor from sliding while using locking forces which are less than those which could cause damage to the cable, and also maintaining a grip which remains constant with the passing of time.

In accordance with the invention, there is provided a device for raising submerged cables and for re-laying them after repairs, characterized by the fact of comprising a plurality of elements for gripping the cable which are disposed in series and which are articulated with respect to one another on a length of cable.

According to a preferred embodiment of the invention, the cable gripping elements, which are disposed in series, have at least one flexible elongate body, e.g. a metallic rope, extending through and secured to each of them, which forms the articulation means for them. Moreover, these elements comprise pairs of jaws which define an internal channel for the cable, and the jaws of each pair are connected to one another by at least one elastic means which compensates for any eventual yielding of the cable with the passing of time, which yielding could loosen the grip.

Other objects and advantages of the present invention will be apparent from the following detailed description of the presently preferred embodiments thereof, which description should be considered in conjunction with the accompanying drawings in which:

FIGS. 1 and 2 are a lateral view and a top view respectively of the device of the invention applied to a cable; and FIG. 3 is an enlarged, transverse cross-section of one of the articulated elements of which the device is comprised.

With reference to FIGS. 1 and 2, an end portion of a submerged electric cable 2 is secured to a cable-raising device 1 which comprises a plurality of elements or units 5 disposed in series and articulated to one another through a pair of flexible, elongate elements 10 and 11. Depending upon the type of cable, its size and its weight, the device 1 comprises two or more elements 5. The cable 2 is lifted by means of the elements 10 and 11.

Rings 3 and 4 are applied to the cable for preventing the occurrence of concentrated bends during the passage of the cable along the laying pulleys.

In the embodiment illustrated, the flexible elongate elements 10 and 11 are two metal ropes formed by stranded or twisted steel wires which traverse the elements 5.

The structure of each of the elements 5, which have rounded convex facing surfaces for facilitating their rotation relative to each other will now be described in connection with FIG. 3 which shows a transverse cross-section of one element 5.

Each element 5 comprises a pair of jaws 20 and 21 of a suitable form and dimension which depend upon the dimensions and the weight of the cable to be raised. The two jaws define an internal channel 18 and have holes 24 and 25 therethrough and through which pass the ropes 10 and 11 which constitute the elongate elements for the connection and the articulation between the elements 5. Said ropes 10 and 11 are releasably secured to the jaws of one pair by means of screws 28 and 29.

The means for connecting both sides of the two jaws 20 and 21 are substantially symmetrical, and therefore, only those connecting means shown at the right-hand side of FIG. 3 will be described. The extremity 30 of the jaw 21 has a pivot pin 31 which is pivotably received in the end of a sleeve 32. Inside the sleeve 32, there is disposed an elastic means 36 and a slide-bar 37. In the illustrated embodiment, the elastic means is constituted by a series of Belleville washers which are disposed around the slide-bar 37. The protruding end portion of the slide-bar 37 is threaded for securing it to the jaw 20.

Therefore, the pair of jaws 20 and 21, which receive the cable 2 in the internal channel 18, are connected to each other by means which is elastically deformable and are joined at their extremities. The threads of the slide-bar 37 engage with the threads of the nut 39, engaging the jaw 20, and by rotating the nut 39, and the corresponding nut 39a at the opposite side of the jaw 20, the jaws 20 and 21 are brought toward each other to grip the cable 2.

The elastic means 36 compensates for any eventual yielding of the cable which could loosen the grip with the passing of time.

It will be apparent that the objects of the invention are accomplished. The plurality of elements 5, which are rounded along their contacting surfaces 5a (FIG. 1) and connected by the metallic ropes 10 and 11, permits gripping of the cable which is distributed along a considerable length of the cable in such a manner as to reduce the magnitude of the compressional forces applied to the cable by each of the elements 5. Moreover, each of the elements 5 is formed by jaws connected to each other through elastic elements which constantly maintain the grip on the cable even if the cable deforms, with the passing of time, due to the effects of the pressure applied. The articulation between the elements 5, due to the presence of the elements 10 and 11, allows the cable to assume a curved configuration since the device is not rigid in the direction of the length of the cable.

Therefore, any application of dangerous stresses is prevented where the raising means grips the cable.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An articulated clamp for the raising and laying of an electric cable having a conductor surrounded by insulation which is surrounded by a sheath, said clamp comprising:
 a plurality of clamping units for gripping said cable, said units being disposed in series along a line extending parallel to the length of the cable, each of said units comprising a pair of jaws movable toward and away from each other and providing an opening therebetween for receiving said cable, the opening of each of the pairs of jaws being aligned with the openings in the other jaws in the direction of the length of the cable, and means for urging said one jaw of a pair of jaws toward the other jaw of a pair of jaws and thereby gripping said cable, said means for urging said one jaw toward said other jaw comprising compressing means interconnecting said one jaw with said other jaw, said compressing means comprising a sleeve pivotally connected to said one jaw and a threaded slide-bar having one end within and connected to said sleeve and connected at its threaded portion to said other jaw by a rotatable nut and spring means acting between said sleeve and said slide-bar and compressible upon rotation of said nut to move said one jaw toward said other jaw; and
 articulation means interconnecting said units and permitting said units to pivot around axes extending perpendicular to said line.

2. An articulated clamp as set forth in claim 1 wherein said articulation means comprises at least one flexible elongated metal rope extending between and secured to said units.

* * * * *